July 27, 1937.  W. F. SKEATS  2,088,445
CIRCUIT BREAKER TESTING ARRANGEMENT
Filed April 3, 1936

Inventor:
Wilfred F. Skeats,
by Harry E. Dunbar
His Attorney.

Patented July 27, 1937

2,088,445

UNITED STATES PATENT OFFICE 2,088,445

CIRCUIT BREAKER TESTING ARRANGEMENT

Wilfred F. Skeats, Scotia, N. Y., assignor to General Electric Company, a corporation of New York Application April 3, 1936, Serial No. 72,543

14 Claims. (Cl. 175—183)

My invention relates to arrangements and methods for testing circuit breakers.

The principal object of my invention is to provide for testing circuit breakers under conditions of voltage and current, occurring when closing or more particularly when interrupting a circuit which is supplying full rated short-circuit power to a load, without actually consuming so much power and without requiring a power source capable of delivering so much power.

Other and further objects and advantages will become apparent as the description proceeds.

For the protection of electric power transmission systems and, to a lesser degree, for normal switching operations, on such systems, it is necessary to have circuit breakers capable of interrupting the maximum current which the system is capable of delivering and, at the same time, withstanding the full voltage occurring in the system. In the case of superpower systems tying together many generator plants over extremely high-voltage transmission lines, circuit breakers may be subjected to very severe service and the importance of adequate tests to insure suitability of circuit breakers is very great. However, testing a circuit breaker for a superpower system under full expected voltage and current would mean either endangering the system to make tests on untried breakers or entailing prohibitive expense in building special testing power plants of equivalent power capacity. It is, therefore, desirable to find means of subjecting a circuit breaker to full current and voltage without the actual expenditure of a corresponding amount of power. Such a procedure also has the advantage of permitting tests at the factory where the breakers are produced.

In carrying out my invention in its preferred form, I connect a pair of circuit breakers or circuit-breaker units in series to a power source capable of delivering the desired current but at low voltage, and I provide a step-up transformer for subjecting at least one of the circuit breakers to the desired voltage. The arrangement is such that both circuit-breaker units clear together or such that the tested breaker clears very slightly later so that it will be subjected to the full recovery voltage while clearing its current.

Figure 1:
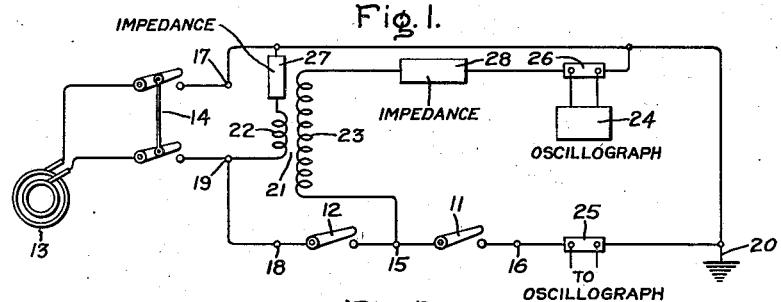
Figure 2:
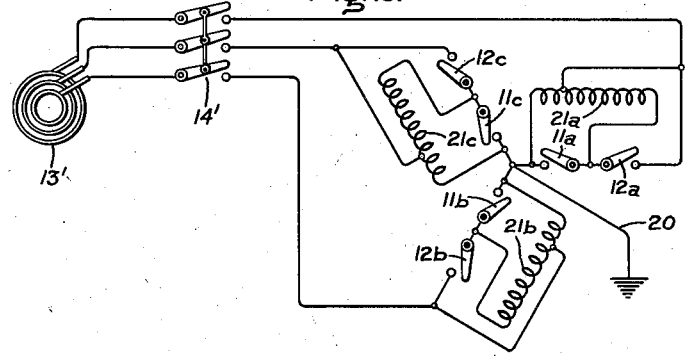
Figure 3:
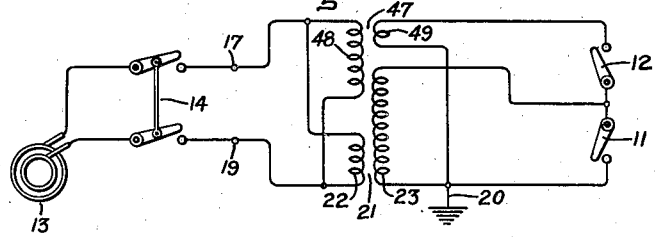
Figure 4:
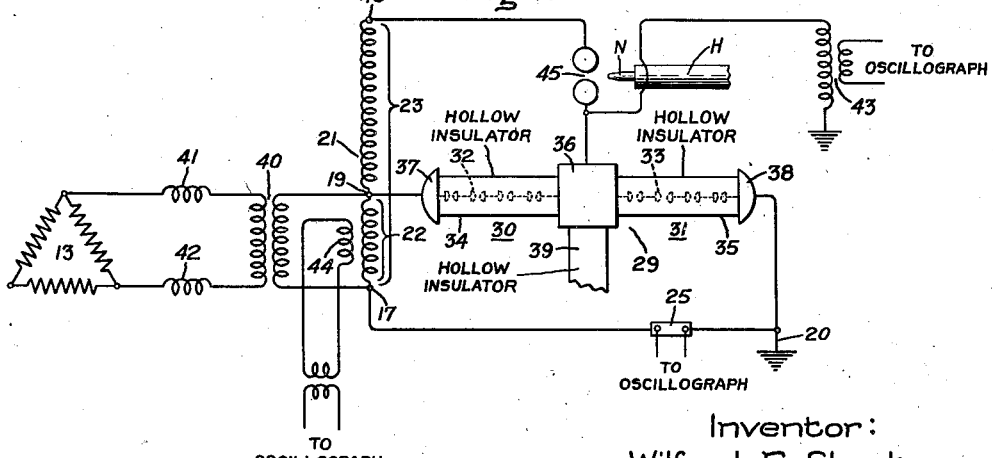

The invention will be understood more readily from the following detailed description when considered in connection with the accompanying drawing and those features of the invention which are believed to be novel and patentable will be pointed out in the claims appended hereto. In the drawing, Fig. 1 is a circuit diagram representing schematically one embodiment of my invention; Fig. 2 is a circuit diagram of another embodiment of my invention arranged for three-phase tests; Fig. 3 represents still another embodiment of my invention with separate transformers for supplying current and voltage; and Fig. 4 is a circuit diagram illustrating the application of my invention to two-unit breakers. Like reference characters are used in the drawing to designate like parts throughout.

Circuit breakers now in use for high-voltage circuits are ordinarily arranged to separate their contacts in oil or other insulating liquid and are customarily provided with electrically controlled power-driven mechanism for carrying out the circuit-closing and interrupting operations. My invention will be described with reference to such circuit breakers but it will be understood that the invention is not limited thereto.

Referring now to Fig. 1, I have shown schematically a circuit breaker or a circuit-breaker unit 11, which is to be tested, in series with an auxiliary breaker or breaker unit 12 across a suitable source of current, such as an alternator 13. If desired, a double-pole switch 14 may be interposed. Ordinarily, it is desirable that the circuit breakers or units 11 and 12 be similar for reasons which hereinafter appear. The current source 13 is of such capacity as to supply the full current at which it is desired to test the breaker. Each breaker necessarily has one or more movable contacts and one or more stationary contacts suitably connected to a pair of terminals so that an electrical circuit may be closed or interrupted between such terminals by the operation of the circuit breaker. Inasmuch as the circuit breakers 11 and 12 are in series, they will have a common terminal 15 (electrically speaking); the tested breaker 11 will have a terminal 16 connected to one side 17 of the current source 13, here shown as the low-side or grounded terminal; and the auxiliary breaker will have a terminal 18 connected to the side 19 of the current source 13, here the high-side or high-potential terminal. For safety, the ground connection 20 is desirable.

In order to provide the requisite high voltage, a step-up transformer 21 is provided, which may be either of the autotransformer type with high and low-potential windings partially common or of the independent-winding electro-magnetically coupled type. In Fig. 1, the low-potential primary winding 22 and the high-potential secondary winding 23 are shown independent. The primary winding 22 is connected across the current source 13 at the terminals 17 and 19 and the secondary winding 23 is connected to the low-side terminal 17 of the current source, in effect, to the terminal 16 of the tested breaker 11 and to the common terminal 15. It is apparent that the high-potential winding 23 is connected across the terminals 15 and 16 of the tested breaker 11.

It will be understood that, for obtaining records of tests made on an oscillograph 24, suitable oscillograph attachments are provided, such as a current shunt, or a transformer 25 in series with the breaker terminals, a shunt 26 in series with the transformer winding 23, suitable potential transformers or multipliers, an attachment for recording motion of the breaker mechanism or contacts, and possible attachments for recording other conditions. Such oscillographs and attachments, however, do not constitute a part of my invention and relate to recording the results of the test rather than to the arrangement or method of subjecting the breaker to the test. Furthermore, such oscillographs and attachments are well known to those skilled in the art and a more detailed description or illustration thereof is deemed unnecessary.

When testing the interrupting ability of the circuit breaker or circuit-breaker unit 11, both breakers 11 and 12 are first closed. The desired current is passed through by energizing the alternator 13 and closing the switch 14, or vice versa, as may be considered expedient according to the design of the alternator. Both breakers are then opened simultaneously. To this end, their operating mechanisms are preferably connected together electrically or mechanically and the use of breakers which are similar obviously facilitates causing simultaneous operation. Assume that the breakers 11 and 12 clear, i. e., finally interrupt the current simultaneously. The breaker 11 has interrupted the desired current supplied by the source 13 and has been subjected to the desired recovery voltage by the high-potential winding 23. The effect on the breaker is, therefore, the same as if it had actually interrupted power considerably in excess of the capacity of the source 13.

What is known as OCO and any other tests may, of course, also be made with my test circuit, the OCO test being one in which both breakers are initially open and are then closed upon a live-power source, whereupon they are opened or open themselves automatically.

In the explanation of the operation of the apparatus of Fig. 1, it was assumed that the breakers 11 and 12 clear simultaneously at the same current zero. Consequently for consistent operation in the manner described, it is desirable not only that the breakers 11 and 12 be similar in type but that they have a definite tendency to clear on a predictable current zero. The breaker 12 should be one which will extinguish an arc at the normal current zero even if the recovery voltage is in the same direction as immediately before the current zero. It is important that the current through the breaker 11 should not reach zero before the current in the breaker 12, otherwise the switch 11 would have the benefit of a very short rest interval during which it neither carried current nor was subjected to voltage across its contacts. There would be no appreciable voltage across the contacts for the reason that the breaker 12 short circuits the high voltage winding 23 through the primary winding 22. If the current through the breaker 12 reaches zero a short time before the current through the breaker 11, however, and is extinguished at that time, the only change from normal conditions is that the current through the breaker 11 decreases from that time at a slower rate than normal to its zero value. Thus, examining the current through the breaker 11 with reference to the time of current zero, for a short interval before this time, the current is somewhat less than would normally be expected. So long as this interval is kept reasonably short and so long as the change in current is not more than four or five to one, it may be that this change is not of tremendous importance. Nevertheless, I shall hereinafter explain how I have eliminated even this current distortion.

Manifestly, if the breakers 11 and 12 should clear on entirely different current zeros, i. e., one or more half cycles apart, the duty of both would be relatively light, irrespective of which breaker cleared first because the high voltage winding 23 would be short circuited by one breaker and would thus prevent application of recovery voltage to the other breaker; hence, the desirability that the breakers have a definite tendency to clear on a predictable current zero. I have found that circuit breakers of the impulse type and of the cross-blast type have sufficiently definite characteristics for convenient and satisfactory testing by the methods described. By impulse-type breakers, I mean those that force oil between the separating contacts either by the use of an explosion chamber or an oil-pumping piston. By cross-blast breakers, I mean those in which the oil is forced in a stream moving transversely to the direction of motion of the movable contact as explained more in detail in an article by D. C. Prince entitled "Circuit Breakers for Boulder Dam Line", appearing at page 366, et seq., in Electrical Engineering for April 1935, volume 54, No. 4.

In testing breakers not having the apparently desirable interrupting characteristics mentioned in the foregoing paragraphs, it may be necessary to conduct a very large number of tests and discard the results of those in which the oscillographic records indicate that the auxiliary breaker 12 cleared after the tested breaker 11 or in which the auxiliary breaker 12 cleared too long before the tested breaker 11. If it is borne in mind that the oscillograph shunt 26 records any current which may flow through the breaker 11 after the auxiliary breaker 12 has interrupted, the selection of satisfactory test records may be facilitated.

With the circuit of Fig. 1 as thus far described there is a tendency for the auxiliary breaker 12 to clear before the tested breaker 11 by an amount depending upon the arc voltages of the two breakers, by reason of the fact that the breaker 11 is subjected to the full secondary voltage of the winding 23 whereas the voltage across the breaker 12 is diminished by the voltage of the winding 22. The time interval between the current zeros in the two breakers can be reduced to a very low value by the use of a satisfactory impedance, for example, resistance or capacity or a combination thereof in series with either the high-side or the low-side winding of the transformer 21. Such impedances 27 and 28 are shown in series with the windings 22 and 23, respectively. Either one or both of the devices 27 and 28, if not a simple conductor without appreciable impedance as in the arrangement first described, may consist of a simple resistance, or capacity, or a spark gap, or a variable resistance element, which falls in resistance or volt-ampere ratio as the applied voltage and current increase, such as described in United States Patent No. 1,822,742 to McEachron, or a variable reactance element, or a combination of one or more of them. Such impedance devices hold back the application of the transformer voltage until the breakers are ready to interrupt and thus cause simultaneous interruption. The function of such impedances will be explained more in detail in connection with the embodiment of Fig. 4.

My invention is particularly well adapted to testing double-unit multibreak impulse crossblast circuit breakers of the type described more in detail in the hereinbefore mentioned article by D. C. Prince in Electrical Engineering. Such a circuit breaker is represented schematically at 29 in Fig. 4. The complete breaker assembly 29 includes two circuit-breaker units 30 and 31, having groups of relatively movable contacts 32 and 33 contained within hollow oil-filled insulators 34 and 35, respectively. There is a metallic member 36 to which adjacent contacts are connected and it, therefore, forms a common terminal for the breaker units 30 and 31. The service terminals of the complete breaker 29 are the studs 37 and 38, which may, therefore, be regarded as the remaining terminals of the breaker units 30 and 31. There is a central hollow insulator and supporting column 39 containing a breaker-operating rod of insulating material (not shown), and the operating rod is connected by suitable linkages (not shown) to the movable contacts in both breaker units 30 and 31.

The step-up transformer 21 is in the form of an autotransformer with the turns of its primary winding 22 included in the turns of its secondary winding 23. There is an intermediate transformer 40 between the alternator 13 and the primary winding 22, and reactors 41 and 42 are interposed for fixing the current flowing through the breaker units 30 and 31. An oscillograph potential transformer 43 is provided for measuring voltage across the breaker unit 31 and a winding 44 is provided on the transformer 21 for oscillographic measurement of transformer output current. It will be understood that the instrument transformers may take the form of either electromagnetic or electrostatic transformers or resistance units and may be adapted to actuate electromagnetic, cathode-ray or other types of oscillographs or instruments. The impedance 28 of Fig. 1 is seen to take the form of a sphere spark gap 45 with one sphere connected to the high-side or high-potential terminal 46 of the winding 23 and the other sphere connected to the common terminal 36 of the breaker units 30 and 31. If desired a stream of illuminating gas may be allowed to play upon the gap for the purpose of reducing its resistance after the gap has broken down and ignited the gas. For example, such a combustible gas may be supplied through an insulating rubber hose H, terminating in a nozzle N.

It is evidence that, in testing the complete circuit breaker 29, one half is tested at a time. The breaker unit 31 is tested while employing the breaker unit 30 as an auxiliary breaker and the unit 30 is tested by reversing the connections to the terminals 37 and 38. The operation in general is similar to that first described in connection with Fig. 1. However, owing to the interposition of the sphere gap 45, there is no external circuit to the common terminal 36 and the currents in both breaker units must be unquestionably identical, clearing at the same instant. The sphere gap 45 is set at such a value as not to be broken down by arc voltage of the breaker units but to be broken down readily at any voltage appreciably higher, such as occurs on the rise of the voltage recovery curve immediately after interruption. The sphere gap 45, therefore, prevents current flow in its high-voltage circuit during shortcircuit of the current source by the breaker units, but makes its circuit available for application of high voltage immediately upon the cessation of the short-circuit current.

An arrangement for testing three-phase circuit breakers or three-phase circuit-breaker units, or for testing single-phase circuit-breaker units simultaneously under three-phase conditions, is illustrated schematically in Fig. 2. The suffixes $a$, $b$, $c$ are used to distinguish corresponding elements in the three phases, the reference numerals with the suffixes otherwise having the same significance as in Fig. 1. The primed numerals represent parts corresponding to those in Fig. 1 but suitable for three-phase.

The arrangement of Fig. 3 differs from that of the other figures in that a step-down transformer 47 with primary and secondary windings 48 and 49, respectively, is employed for providing the short-circuit current flowing in the breaker units 11 and 12. The recovery voltage is supplied as before by the step-up transformer 21.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An arrangement for testing circuit-breaker units at rated kilovolt amperes without the expenditure of a corresponding amount of power, said arrangement comprising in combination with the circuit-breaker unit to be tested, an auxiliary circuit-breaker unit, a source of alternating current, a step-up transformer with relatively high and low voltage windings, and a sphere gap, said circuit-breaker units having terminals adapted to be separated for breaking electrical circuits and being so connnected to said current source that said breaker units have a common terminal, one unit having another terminal connected to one side of said source and the other unit having another terminal connected to the other side of said source, said low-voltage winding being connected across said source, said high-voltage winding being connected on one side to one side of said source, and said sphere gap being connected between the other side of said high voltage winding and said common terminal of the circuit breaker units.

2. An arrangement for testing circuit-breaker units comprising in combination with a unit to be tested, an auxiliary circuit-breaker unit, a source of alternating current, a step-up transformer with relatively high and low-voltage windings, and a spark gap, said low-voltage winding being connected to said current source, said circuit-breaker units being connected in series across said current source, and said high-voltage winding being connected in series with said spark gap across the circuit-breaker unit under test.

3. An arrangement for testing circuit-breaker units comprising in combination with a unit to be tested, an auxiliary circuit-breaker unit, a source of alternating current, a step-up transformer with relatively high and low-voltage windings, and a spark gap, said low-voltage winding being connected to said current source, said circuit-breaker units being connected in series across said current source, and said high-voltage winding being connected in series with said spark gap across said circuit breaker unit to be tested, said spark gap being adjusted to break down at a voltage exceeding the arc voltage of the breaker unit under test but less than the voltage of said high-voltage winding.

4. An arrangement for testing circuit-breaker units comprising in combination with a unit to be tested, an auxiliary circuit-breaker unit, a source of relatively high alternating current, a source of relatively high alternating voltage, common means for energizing said sources, and a spark gap, said breaker units being connected to said current source in series, said voltage source being connected in series with said spark gap across the breaker unit under test.

5. An arrangement for testing circuit-breaker units comprising in combination with a unit to be tested, an auxiliary circuit-breaker unit, a source of relatively high alternating current, a source of relatively high alternating voltage, and a variable impedance device becoming a relatively good conductor upon being subjected to voltage, said circuit-breaker units being connected in series to said current source, and said voltage source being connected in series with said impedance device across said unit under test.

6. An arrangement for testing circuit-breaker units comprising in combination with a unit to be tested, an auxiliary circuit-breaker unit, a source of alternating current, a step-up transformer with primary and secondary windings, and a variable impedance device having a decreasing volt-ampere ratio, said primary winding being connected to said current source, said circuit-breaker units being connected in series across said current source, said high-voltage winding being connected across a circuit breaker to be tested, and said variable-impedance device connected in series with one of said transformer windings.

7. An arrangement for testing circuit-breaker units comprising in combination with a unit to be tested, an auxiliary circuit-breaker unit, a source of alternating current, and a step-up transformer with primary and secondary windings, said primary winding being connected to said current source, said circuit-breaker units being connected in series across said current source, and said secondary winding being connected across said circuit-breaker unit to be tested.

8. An arrangement for testing circuit-breaker units in polyphase comprising in combination with a plurality of units to be tested, a plurality of auxiliary circuit-breaker units, a source of polyphase alternating current, and a step-up transformer with primary and secondary windings for each phase, said primary windings being connected to said current source, said circuit-breaker units being connected in pairs each comprising a unit to be tested and an auxiliary unit, each pair being connected in series across one phase of said current source, said secondary windings each being connected across the circuit breaker unit to be tested associated with the corresponding phase.

9. An arrangement for testing two-unit circuit breakers comprising a source of alternating current, a step-up transformer with primary and secondary windings, and a spark gap, said primary winding being connected to said current source and having terminals to which the units of a two-unit circuit breaker are adapted to be connected in series, said secondary winding including in its circuit said spark gap and being adapted to be connected across one of said circuit-breaker units.

10. A testing arrangement comprising in combination with a two-unit circuit breaker having end terminals and an intermediate terminal common to the units of the circuit breaker, a source of alternating current, a step-up transformer with primary and secondary windings, and a spark gap, said primary winding being connected to said current source, the end terminals of said circuit breaker being connected to said current source, and said secondary winding being connected in series with said spark gap to one of the end terminals of said circuit breaker and to the common intermediate terminal thereof.

11. An arrangement for testing circuit-breaker units comprising in combination with a unit to be tested, an auxiliary circuit-breaker unit, means for producing a low voltage current flow through said circuit-breaker units in series, and means for subjecting the circuit breaker to be tested to relatively high recovery voltage upon interruption of current therein.

12. An arrangement for testing circuit breakers comprising a relatively low voltage source of current adapted to be short circuited by a circuit breaker adapted to open said short circuit, means for disconnecting the circuit breaker from said source substantially simultaneously with the opening of the circuit breaker, and means for subjecting said circuit breaker to a recovery voltage of greater magnitude than would be available from said current source immediately upon interruption of current by said circuit breaker.

13. The method of testing a circuit breaker under current and voltage conditions exceeding the volt-ampere capacity of the source of testing current available which consists in connecting said circuit breaker across such source to produce a heavy current at low voltage, disconnecting said breaker from the source, substantially simultaneously causing said breaker to interrupt said current and as the current is being interrupted, utilizing the released volt-ampere capacity of said source to produce a high voltage and impressing said voltage across said circuit breaker.

14. An arrangement for testing circuit-breaker units comprising in combination with a unit to be tested, an auxiliary circuit-breaker unit, a source of alternating current, a step-up transformer with relatively high and low-voltage windings, a spark gap, and means for playing a stream of combustible gas against said spark gap, said low voltage winding being connected to said current source, said circuit-breaker units being connected in series across said current source, and said high-voltage winding being connected in series with said spark gap across said circuit-breaker unit to be tested.

WILFRED F. SKEATS.